Feb. 17, 1970  D. S. YOUNG  3,495,914

METHOD FOR ALIGNING OPTICAL SYSTEMS

Filed Oct. 25, 1966  3 Sheets-Sheet 1

INVENTOR
D. S. YOUNG
BY W. L. Williamson
ATTORNEY

Feb. 17, 1970   D. S. YOUNG   3,495,914
METHOD FOR ALIGNING OPTICAL SYSTEMS
Filed Oct. 25, 1966   3 Sheets-Sheet 2

United States Patent Office 3,495,914
Patented Feb. 17, 1970

3,495,914
METHOD FOR ALIGNING OPTICAL SYSTEMS
Donald Sanford Young, Windham, N.H., assignor to Western Electric Company, Incorporated, New York, N.Y., a corporation of New York
Filed Oct. 25, 1966, Ser. No. 589,450
Int. Cl. G01b 11/26
U.S. Cl. 356—154         3 Claims

ABSTRACT OF THE DISCLOSURE

A method for aligning an optical cavity is disclosed wherein a laser beam is employed to align each element separately. One element at a time is added to the cavity and aligned by observing an increase in the intensity of the aligning laser beam due to increased stimulated emission in the laser which occurs when an element is aligned relative to the beam. Compensation for inhomogeneity in a laser rod disposed in the optical cavity may be obtained by employing an aligning beam having substantially the same wavelength as that generated by the laser rod.

This invention relates to a method for aligning optical systems and more particularly to a method for aligning a laser optical cavity.

As is well known in the art, a solid state laser basically includes a crystalline laser material, a laser optical cavity and a laser pump. The crystalline laser material is usually shaped in the form of a cylindrical rod having flat parallel end faces. The optical cavity is usually formed by positioning the laser material between two discrete reflecting surfaces. The laser pump is usually a high intensity lamp which "excites" the laser material.

While it is possible by conventional techniques to align two discrete reflecting surfaces to a high degree of parallelism, such conventional techniques are inadequate to properly align the laser optical cavity. Even though the reflecting surfaces of the laser optical cavity are exactly parallel to each other, any inhomogeneity in the laser material itself will deflect the laser beam, thereby disturbing the alignment from an optical standpoint.

Adjustment of the reflecting surfaces to compensate for such inhomogeneity has previously been accomplished only by trial and error. This is extremely tedious and failure prone. As the efficiency of the laser is directly dependent upon proper alignment of its optical cavity, an accurate and simple technique for accomplishing the proper alignment of the optical cavity is highly desirable.

It is, therefore, an object of this invention to provide a method for properly aligning a laser optical cavity.

With this and other objects in view, the method of this invention contemplates the steps of (1) directing a laser beam through a reflecting surface of a laser material, (2) adjusting the position of the laser material in the laser beam until the intensity of the laser beam increases, (3) inserting a first discrete reflecting surface in the laser beam to reflect light back toward the laser material, (4) adjusting the first reflecting surface until the intensity of the laser beam increases, (5) inserting a second discrete reflecting surface in the laser beam to form a laser optical cavity with the first reflecting surface, and (6) adjusting the second reflecting surface until the intensity of the laser beam increases.

A more complete understanding of this invention may be had by reference to the following detailed description when taken in conjunction with the following drawings, wherein.

Figure 1:
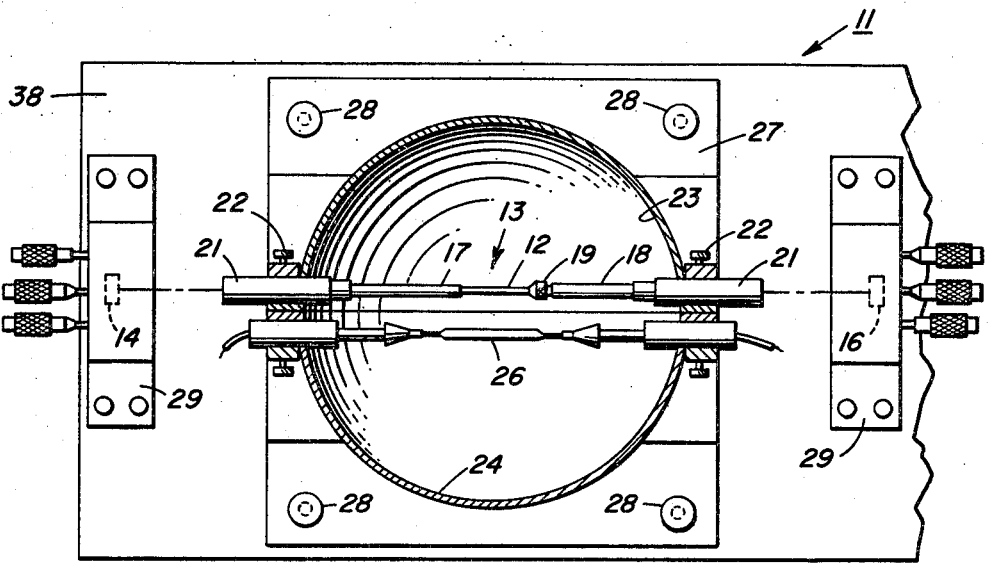
FIG. 1 is a top view of a solid state laser of the type suitable for alignment by the method of this invention having portions cut away for greater clarity.

Referring now to the drawings, a detailed description of an apparatus suitable for practicing the invention will be given followed by a detailed description of the method of the invention.

Apparatus description

Figure 2:
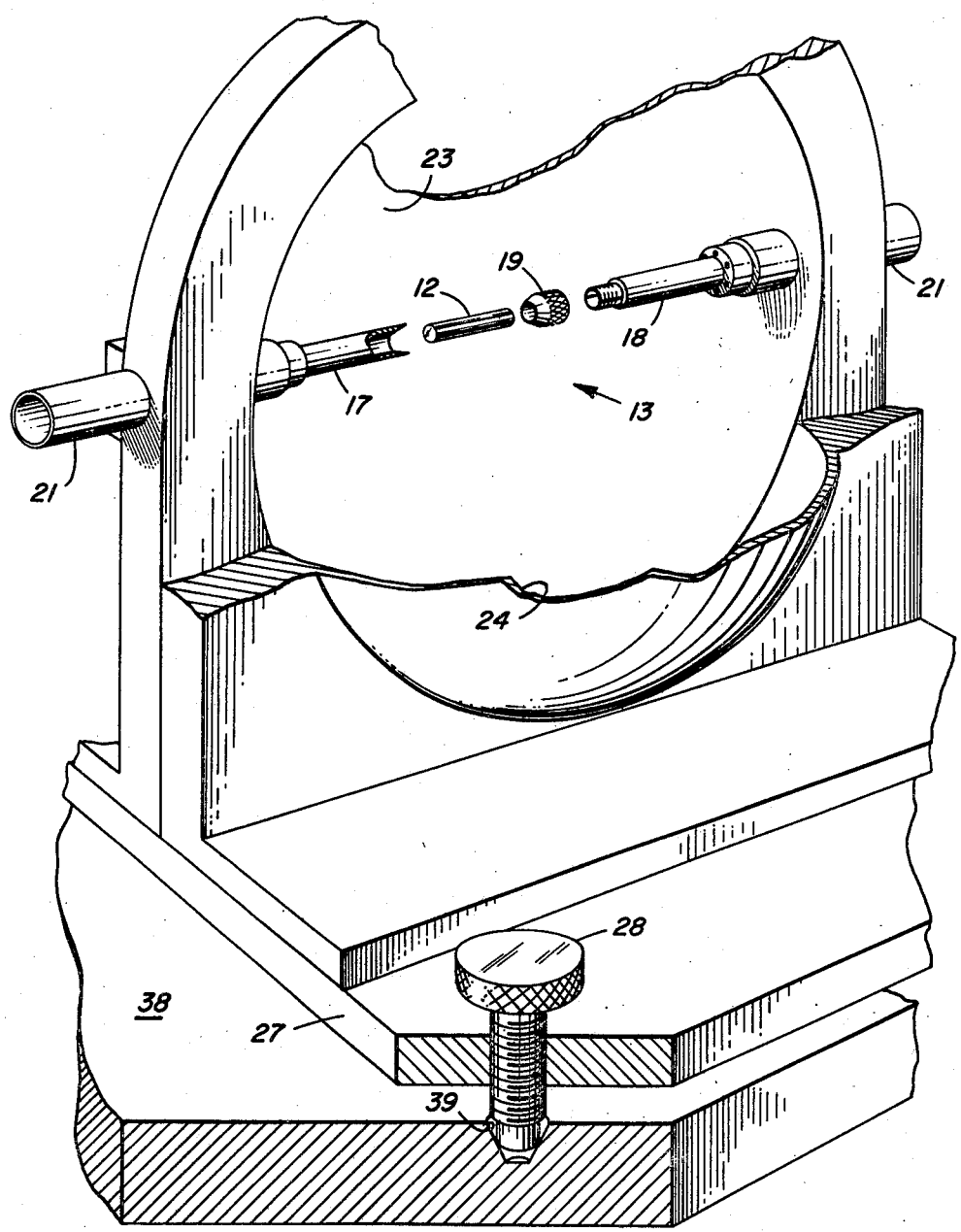
FIG. 2 is an enlarged, exploded view taken from FIG. 1 which shows in greater detail an arrangement suitable for mounting laser material.

A solid state laser generally indicated by reference numeral 11 is illustrated in FIGS. 1 and 2. The laser 11 includes a laser rod 12 of laser material such as a sapphire crystal doped with a small amount of chromium. The laser rod 12 usually has a right cylindrical configuration, i.e., both end faces are perpendicular to the longitudinal axis of the rod, although a circular cross-section is not essential to the operation of the laser.

A conventional mounting fixture generally indicated by reference numeral 13 (FIG. 2) is illustrated for holding the laser rod 12 within a laser optical cavity defined by reflecting surfaces 14 and 16. The mounting fixture 13 includes two crystal holders 17 and 18. The crystal holder 17 is recessed at one end (FIG. 2) to seat the laser rod 12 therein and align the laser rod with the holder. The crystal holder 18 is a split collet which is threaded to receive an adjusting nut 19. The crystal holders 17 and 18 are fixedly mounted in sleeves 21—21 and the sleeves 21—21 are slidably mounted in mounting fixture 13 to position the recessed end of holder 17 and the threaded holder 18 in an opposing relationship.

To mount the laser rod 12 in fixture 13, the rod is first inserted in the holder 18 and adjusting nut 19 tightened to grip the rod in the holder. The sleeves 21—21 are then advanced towards each other to advance the holders 17 and 18 until the rod 12 is seated in the recessed end of crystal holder 17. When the laser rod 12 is properly held by holders 17 and 18, the set screws 22—22 (FIG. 1) are tightened to lock the holders into position.

The fixture 13 is also provided with opposed reflectors 23 and 24 to concentrate pumping energy from a suitable pumping source 26 (FIG. 1) onto the laser rod 12. The entire fixture 13 is mounted on a base 27 which is provided with four adjusting screws 28—28, one screw at each corner of the base 27. These adjusting screws 28—28 facilitate the positioning of the laser rod 12 relative to the reflecting surfaces 14 and 16.

Figure 3:
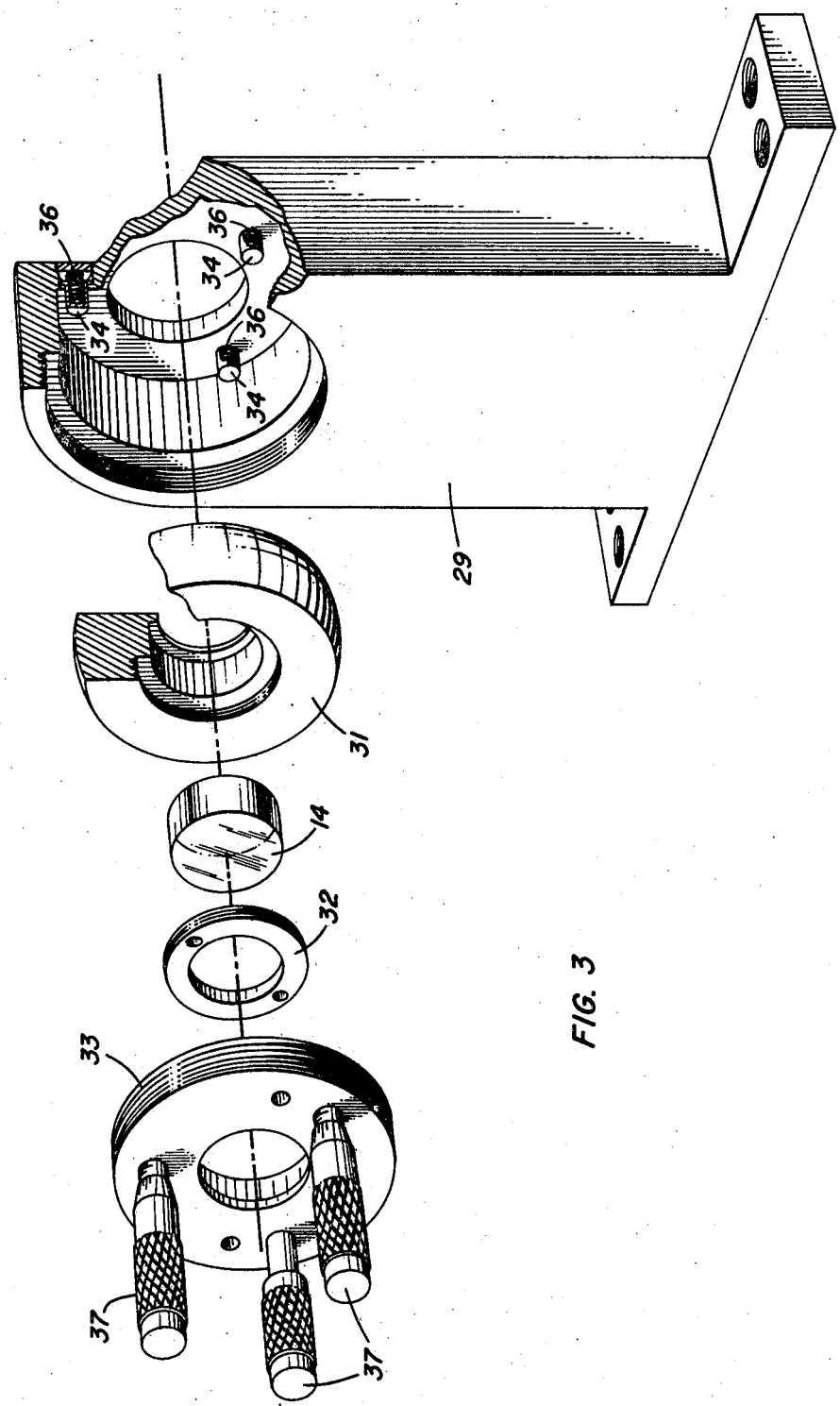
FIG. 3 is an enlarged, exploded view taken from FIG. 1 which shows in greater detail an arrangement suitable for mounting reflecting surfaces of a laser optical cavity.

Reflecting surfaces 14 and 16 are retained in a pair of mounting fixtures 29—29 as shown most clearly in FIG. 3. FIG. 3 is directed specifically to the fixture which retains reflecting surface 14, but both fixtures are substantially identical. The reflecting surface 14 is fixedly mounted in a generally toroidal member 31 by threading a retaining ring 32 into the toroidal member to lock the reflecting surface 14 therein. The toroidal member 31 is retained in the mounting fixture 29 by threading an apertured face plate 33 into the fixture 29.

The mounting fixture 29 is provided with three pins 34—34 positioned at 120 degree intervals which are urged against the toroidal member 31 by springs 36—36. Adjusting screws 37—37 are threaded through the face plate 33 at 120 degree intervals to engage the toroidal member 31. Adjustment of screws 37—37 positions the toroidal member 31 against the pins 34—34 to displace the toroidal member and, therefore, the reflecting surface 14 or 16 into a desired plane. The peripheral surface of the toroidal member 31 is rounded to permit the free movement of member 31 in the mounting fixture 29.

The mounting fixtures 29—29 are fixedly mounted on a base plate 38 in an opposed relationship as shown in FIG. 1. The mounting fixture 13 stands on adjusting screws 28—28 and is positioned on the base plate 38 between the mounting fixtures 29—29. The base plate 38 is provided with conical locating apertures 39—39 for accurately positioning the mounting fixture 13 (FIG. 2).

Method Description

Figure 4:
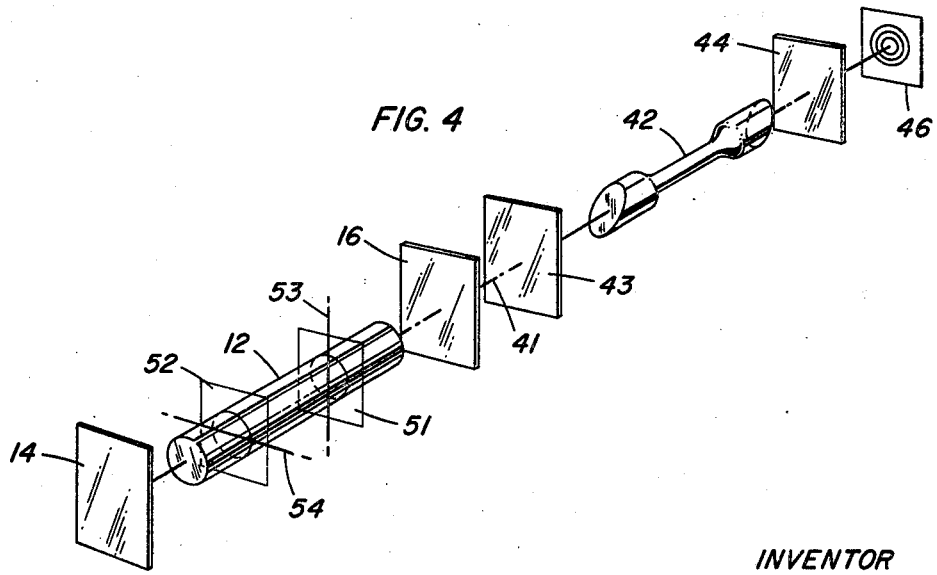
FIG. 4 is a schematic which illustrates an arrangement for aligning the optical cavity of a solid state laser of FIG. 1 employing a low power gas laser.

Referring now primarily to FIG. 4, the method of this invention will be described in greater detail.

The initial step of the method is to pass a laser beam 41 from a laser such as gas laser 42 through the laser rod 12. This may be accomplished by aligning the laser 11 and gas laser 42 relative to each other so that the laser beam 41 passes through both end faces of the laser rod 12.

The next step of the method is to adjust the position of the laser rod 12 until the end face through which the laser beam 41 enters the laser rod is perpendicular to the laser beam. This is accomplished by positioning the laser rod 12 in the laser beam 41 until the intensity of the laser beam increases. It has been discovered that the intensity of a laser beam increases when it strikes a reflecting surface perpendicular thereto.

The uncoated end faces of the laser rod 12 are usually about 6% reflective and will reflect a portion of the laser beam 41 back towards the laser. When an end face of the laser rod is perpendicular to the laser beam 41, the beam is reflected back along its original path into the laser 42. This is equivalent to increasing the reflectivity of mirror 43 of the gas laser 42 and results in an increase in the intensity of the laser beam 41. This occurs as the number of photons passing through the gas laser parallel to the laser beam is increased by a portion of the beam being reflected back into the laser. The increased number of photons increases the stimulated emission of the gas laser to increase the beam intensity.

The optical cavity of the gas laser 42 is defined by two discrete mirrors 43 and 44. The mirrors 43 and 44 are usually referred to as partially reflecting and totally reflecting respectively. Actually, the totally reflecting mirror 44 may be only 99.5% reflective at the wavelength generated by the laser while the partially reflecting mirror 43 may be 98% reflective at that wavelength. The mirrors are usually chosen so that their greatest reflectivity is at the wavelength generated by the laser. Therefore, a portion of the laser beam exits the laser through the totally reflecting mirror. The intensity of the beam may be visually observed on a target 46 positioned opposite the totally reflecting mirror or a photosensitive device (not shown) may be employed. As no change in the intensity of the beam results until a reflecting surface is perpendicular to the beam, the change in the intensity of the beam is readily detected by visually observing the target 46.

For purposes of clarity, the laser rod 12 has been illustrated in FIG. 4 with two planes 51 and 52 passing therethrough. The planes are imaginary and are parallel to the end faces of the laser rod 12 and to each other. As shown, a line 53 lies in the plane 51 and is perpendicular to the longitudinal axis of the laser rod 12. In addition, a line 54 lies in the plane 52 and is also perpendicular to the longitudinal axis of the laser rod. The lines 53 and 54 are also perpendicular to each other.

In order to align and end face of the laser rod 12 to bring it into a perpendicular relationship with the laser beam 41, the laser rod is rotated about line 53 until the line 54 is perpendicular to the laser beam 41 and then the laser rod is rotated about line 54 until the line 53 is perpendicular to the laser beam. Obviously, this may be done in any sequence. When both lines 53 and 54 are perpendicular to the laser beam 41, the end surfaces of the laser rod will be perpendicular to the laser beam.

Rotation about the line 53 may be eliminated by the accurate positioning of the laser 11 and gas laser 42 relative to each other, i.e., if the laser 11 and gas laser 42 are initially positioned relative to each other so that the line 54 is perpendicular to the laser beam 41, additional rotation about line 53 is not required.

The laser 11 and gas laser 42 may be accurately positioned relative to each other by mounting the laser on the same base plate 38 (FIGS. 1 and 2). The laser 11 may be accurately positioned on the base plate 38 by providing locating apertures 39—39 for the adjusting screws 28—28. The gas laser 42 may be accurately positioned on the base plate in an analogous manner.

If desired, rotation about the line 53 may be accomplished to bring line 54 into a perpendicular relationship relative to laser beam 41 by employing a separate plate (not shown) for carrying the adjusting screws 28—28. The mounting fixture 13 is then mounted on the separate plate for rotation about the line 53. Such rotation may be facilitated by utilizing two parallel pairs of opposed adjusting screws carried by the separate plate which act against the mounting fixture in a plane parallel to the plane of the separate plate.

Rotation about line 54 to bring the line 53 into a perpendicular relationship with the laser beam 41 is accomplished by adjusting the screws 28—28. For example, by advancing the screws 28—28 shown at the right in FIG. 1 and/or retracting the screws 28—28 shown at the left in FIG. 1, the laser rod 12 may be rotated counterclockwise about the line 54 as viewed in FIG. 4.

The reflecting surfaces 14 and 16 are usually removed from the mounting fixtures 29—29 while the laser rod 12 is being positioned. After the laser rod 12 is properly positioned, the reflecting surface 14 is mounted in its fixture.

The next step of the method is to position the reflecting surface 14 in the laser beam until the intensity of the laser beam 41 increases to indicate the surface is perpendicular to the beam. Adjustment of the reflecting surface is accomplished as indicated above by adjusting the screws 37—37.

It should be noted that the reflecting surface 14 is not necessarily perpendicular to the laser beam 41 as it enters the laser rod 12, i.e., the laser rod 12 will deflect the laser beam 41 if the rod has any optical inhomogeneity. The laser rod 12 is brought into a perpendicular relationship with the laser beam 41 as deflected by the laser rod. This compensates for any inhomogeneity in the laser rod. As the deflected laser beam strikes the reflecting surface perpendicular to its surface, the beam will retrace its original path back through the laser rod and will exit coincident with the beam as it entered the rod.

The reflecting surface 16 is usually removed from its mounting fixture while the laser rod 12 and the reflecting surface 14 are being positioned. After the laser rod 12 and reflecting surface 14 are properly positioned, the reflecting surface 16 is mounted in its fixture.

The next step of the method is to position the reflecting surface 16 in the laser beam until the intensity of the laser beam 41 increases. This completes the alignment of the laser cavity.

It should be noted that the reflecting surfaces 14 and 16 are not necessarily parallel to each other after alignment of the optical cavity. This lack of parallelism compensates for deflection of the beam due to inhomogeneity of the laser material.

It should be noted that the index of refraction of a material varies with the wavelength of the light passing through the material. Accordingly, optical inhomogeneities in the laser rod 12 will deflect a light beam of one wavelength by a different amount than a light beam of a different wavelength. It is, therefore, desirable that the wavelength of laser beam 41 be as close to the wavelength of the laser beam generated by the laser 11 as possible. A gas laser which generates a laser beam having a wavelength of 6328 angstroms has been found satisfactory for aligning the laser optical cavity of a ruby laser, i.e., a laser employing a chromium doped sapphire crystal, which produces a laser beam having a wavelength of 6943 angstroms.

It is preferable to orient the gas laser 42 with reflecting surface 43 as the partially reflecting surface. This permits the primary laser beam, beam 41, to be directed through laser 11. Reflecting surfaces 14 and 16 of laser 11 may be totally reflecting and partially reflecting, respectively. The opposite arrangement may also be used.

As will be obvious to one skilled in the art, many changes in form and details may be made without departing from the spirit and scope of the invention.

What is claimed is:

1. A method of aligning an optical cavity of a solid state laser and compensating for any inhomogeneity in a laser material, comprising the steps of:
    directing a laser beam through a reflecting surface of the laser material, said laser beam having a wavelength substantially the same as the wavelength of a beam generated by the solid state laser;
    adjusting the position of said laser material until the intensity of said laser beam increases to indicate said reflecting surface is perpendicular to said laser beam;
    inserting a first discrete reflecting surface in said laser beam so that said laser beam is reflected back toward said laser material;
    adjusting the position of said first discrete reflecting surface until the intensity of said laser beam increases to indicate said first discrete reflecting surface is perpendicular to said laser beam;
    inserting a second discrete reflecting surface in said laser beam to form a laser optical cavity with said first discrete reflecting surface; and
    adjusting the position of said second discrete reflecting surface until the intensity of said laser beam increases to indicate said second discrete reflecting surface is perpendicular to said laser beam.

2. A method for aligning a laser optical cavity including two discrete reflecting surfaces and a laser rod having flat parallel end faces perpendicular to the longitudinal axis of the rod and for compensating for any inhomogeneity in the laser rod, comprising the steps of:
    directing a laser beam through the laser rod so as to pass the beam through both end faces of said laser rod, said laser beam having a wavelength substantially the same as the wavelength of a beam generated by said laser rod;
    adjusting the position of said laser rod until the intensity of said laser beam increases to indicate said end faces of said laser rod are perpendicular to said laser beam;
    inserting a first reflective surface in said laser beam as deflected by said laser rod to reflect said laser beam back toward said laser rod;
    adjusting the position of said first reflecting surface until the intensity of said laser beam increases to bring the plane of said reflecting surface into a perpendicular relationship to said laser beam as deflected by said laser rod;
    inserting a second reflecting surface in said laser beam to form a laser optical cavity with said first reflecting surface, said laser optical cavity having said laser rod intermediate said reflecting surfaces; and
    adjusting the position of said second reflecting surface until the intensity of said laser beam increases to bring the plane of said second reflecting surface into a perpendicular relationship with said incident laser beam.

3. A method for aligning a solid state laser optical cavity and compensating for any inhomogeneity in a laser rod wherein a continuously operating gas laser is employed, the solid state laser optical cavity including two discrete reflecting surfaces and a laser rod having flat parallel end faces perpendicular to the longitudinal axis of the rod, and the gas laser having an optical cavity which includes a totally reflecting mirror and a partially reflecting mirror, the method comprising the steps of:
    directing a laser beam exiting from the partially reflecting mirror of the continuously operating gas laser through both end faces of the laser rod,
    detecting the intensity of said laser beam exiting said gas laser through the totally reflecting mirror,
    adjusting the position of said laser rod in said laser beam until the intensity of said laser beam exiting through said totally reflecting mirror increases to indicate that the end faces of said laser rod are perpendicular to said laser beam,
    inserting a first discrete reflecting surface in said laser beam as deflected by said laser rod to reflect the deflected beam back toward said laser rod,
    adjusting the position of said first discrete reflecting surface until the intensity of said laser beam existing said totally reflecting mirror increases to indicate said first discrete reflecting surface is perpendicular to said laser beam as deflected by said laser rod,
    inserting a second discrete reflecting surface in said laser beam to define a laser optical cavity having said laser rod intermediate said reflecting surfaces, and
    adjusting the position of said second discrete reflecting surface until the intensity of said laser beam exiting said totally reflecting mirror increases to indicate said second discrete reflecting surface is perpendicular to said laser beam.

References Cited

UNITED STATES PATENTS

| | | | |
|---|---|---|---|
| 3,432,240 | 3/1969 | Jackson | 356—152 |
| 3,218,915 | 11/1965 | Ramsay | 331—94.5 |

OTHER REFERENCES

Ready et al., "Effect of Mirror Alignment in Laser Operation," Proceedings of the IRE, vol. 50, No. 12, pp. 2483–2484, December 1962.

P. N. Everett, "Technique for Aligning Laser Mirrors Using Gas Lasers," Rev. Sci. Instruments, 37, p. 375 (1965).

D. R. Herriott, "Optical Properties of a Continuous Helium-Neon Optical Maser," Journal of Opt. Soc. of America, 52, No. 1, pp. 31–37, January 1962.

RONALD L. WIBERT, Primary Examiner

J. ROTHENBERG, Assistant Exaimner

U.S. Cl. X.R.

331—94.5; 356—110, 209